United States Patent [19]
Kasurinen

[11] Patent Number: 5,373,429
[45] Date of Patent: Dec. 13, 1994

[54] ILLUMINATOR, ESPECIALLY A RUNWAY APPROACH FLASHLIGHT

[75] Inventor: Esko Kasurinen, Helsinki, Finland

[73] Assignee: Idman Oy, Mäntsälä, Finland

[21] Appl. No.: 108,726

[22] PCT Filed: Feb. 12, 1992

[86] PCT No.: PCT/FI92/00039
§ 371 Date: Sep. 2, 1993
§ 102(e) Date: Sep. 2, 1993

[87] PCT Pub. No.: WO92/15484
PCT Pub. Date: Sep. 17, 1992

[30] Foreign Application Priority Data
Mar. 7, 1991 [FI] Finland .................................. 911153

[51] Int. Cl.[5] .............................................. F21V 7/00
[52] U.S. Cl. .................... 362/299; 362/153.1;
362/277; 362/319; 362/346
[58] Field of Search ...................... 362/621, 153.1, 277,
362/319, 299, 303, 308, 309, 328, 332, 343, 346, 302

[56] References Cited
U.S. PATENT DOCUMENTS
4,320,442  3/1982  McCamy .................... 362/303 X Primary Examiner—Stephen F. Husar
Attorney, Agent, or Firm—Cushman Darby & Cushman

[57] ABSTRACT

The invention relates to an illuminator, especially a runway approach flashlight, for forming a directable, generally rectangular light beam, comprising a light source, such as a xenon lamp, an illuminator body (1), and a reflector supported to it and comprising a generally cup-like rear reflector (2) fitted behind the light source, and means for directing the light beam. To achieve a light beam of a desired shape and to enable it to be directed, the reflector further comprises an ellipsoidal counter reflector (3) fitted in front of the light source, the main axis of the counter reflector being substantially parallel to the shorter side of the light beam, and the reflector (2, 3) is supported to the illuminator body by means of joints (11), so that the reflector can be tilted with respect to the illuminator body (1).

8 Claims, 2 Drawing Sheets

ILLUMINATOR, ESPECIALLY A RUNWAY APPROACH FLASHLIGHT

BACKGROUND OF THE INVENTION

This invention relates to an illuminator, especially a runway approach flashlight, for forming a directable, generally rectangular light beam, comprising a light source, such as a xenon lamp, an illuminator body, and a reflector supported to it and comprising a generally cup-like rear reflector fitted behind the light source.

Finish Published Specification 66074, for instance, discloses an illuminator of substantially the above-described type for similar purposes. The runway approach flashlight according to the invention should radiate a flashing light so as to form a beam having the shape of a horizontal rectangle in cross-section. This beam has to be directed at a predetermined angle with respect to the horizontal plane. Within the area of the beam, the effective light intensity values have to be adjustable in compliance with various specifications both as concerns the width of the beam and the maximum/minimum ratio of the intensities. In the above-mentioned known arrangement, the illuminator with its casing has been made tiltable for directing the beam by providing the back portion of the casing with a joint with respect to which the front edge of the casing can be lifted by means of an adjusting screw. This way of adjustment requires that the electronics controlling the illuminator unit should be placed in a housing separate from the illuminator in order that the tiltable structure would not be too heavy and clumsy. On the other hand, the directing of this kind of illuminator, that is, the adjustment of the angle of tilt, has to be checked at least after the illuminator has been installed e.g. on a light support possibly several meters above the surface of the earth. In this known arrangement, the light beam itself is shaped by an elliptical rear reflector and optical means positioned in front of a light source. The light distribution in the illuminator is fixed and cannot be adjusted in compliance with various specifications, but possible changes in the distribution of light have to be made by modifying the structure of the illuminator unit itself.

SUMMARY OF THE INVENTION

The object of the present invention is to provide an illuminator in which the light beam is more easily and more simply adjustable in both shape and direction than in the illuminators known from the prior art. This is achieved by means of an illuminator according to the invention, which is characterized in that the reflector further comprises an ellipsoidal counter reflector fitted in front of the light source, the main axis of the counter reflector being substantially parallel to the shorter side of the light beam.

The arrangement of the invention also provides an illuminator in which the illuminator casing need not be tilted for directing the light beam but the light beam is directed by tilting only the reflector and the light source supported to it.

Two prismatic refraction plates of transparent material are supported preferably to the rear reflector, substantially in the plane of its mouth, in such a way that they cover the mouth of the rear reflector with the exception of a substantially centrally positioned area of uniform width. By means of these prismatic refraction plates, both the dimensions and the intensity distribution of the rectangular light beam emitted by the illuminator can be varied. Preferably, the refraction plates are supported to the rear reflector so as to be adjustable. As to the maximum/minimum ratio of the light beam intensities, it is preferable that light can be guided to the corner areas of the primary beam by means of the refraction plates, whereby the refracting angle of the refraction plates may be about 15° and the directional angle within the range from 2° to 5°. The width of the area of uniform width between the refraction plates also affects substantially the maximum/minimum ratio of the intensities.

Furthermore, it is preferable that the rear reflector be divided into three sections substantially parallel with the longer side of the light beam in such a way that when light beams emitted from the light source and returned from the front reflector are reflected from the two outermost sections, they are directed sidewardly, forming an acute angle with respect to the light beams reflected from the middle section. In this way, the light reflected from the rear reflector can be spread outward within its edge areas, and the length of the longer side of the light beam having a rectangular cross-section. That is, the width of the light beam can be adjusted to some extent by the selection of the above-mentioned acute angle. This acute angle is preferably about 6°.

In order to be able to direct the light beam in the illuminator according to the invention with respect to the horizontal plane more simply than previously, the reflector is supported pivotally to the illuminator body. It is also to be preferred that the illuminator body comprises a levelling means which is arranged to indicate the position in which the illuminator body is positioned substantially horizontally, and the reflector comprises a scale plate which can be adjusted positionally with respect to the illuminator body and which indicates the angle of tilt of the reflector with respect to the illuminator body. In this way it can be ensured as early as at the assembly stage of the illuminator that the scale plate attached to the illuminator body is in an appropriate position in view of the vertical position of the reflector; at the installation site, the reflector thus only has to be tilted at a desired angle of tilt by means of the marks of the scale plate. Of course, it is thereby assumed that the illuminator body can be positioned on a horizontal supporting surface, which, on the other hand, can also be checked by means of the levelling means provided in the illuminator body.

BRIEF DESCRIPTION OF THE DRAWINGS

In the following, the illuminator according to the invention will be described in more detail with reference to the attached drawings, in which.

DETAILED DESCRIPTION

Figure 1:
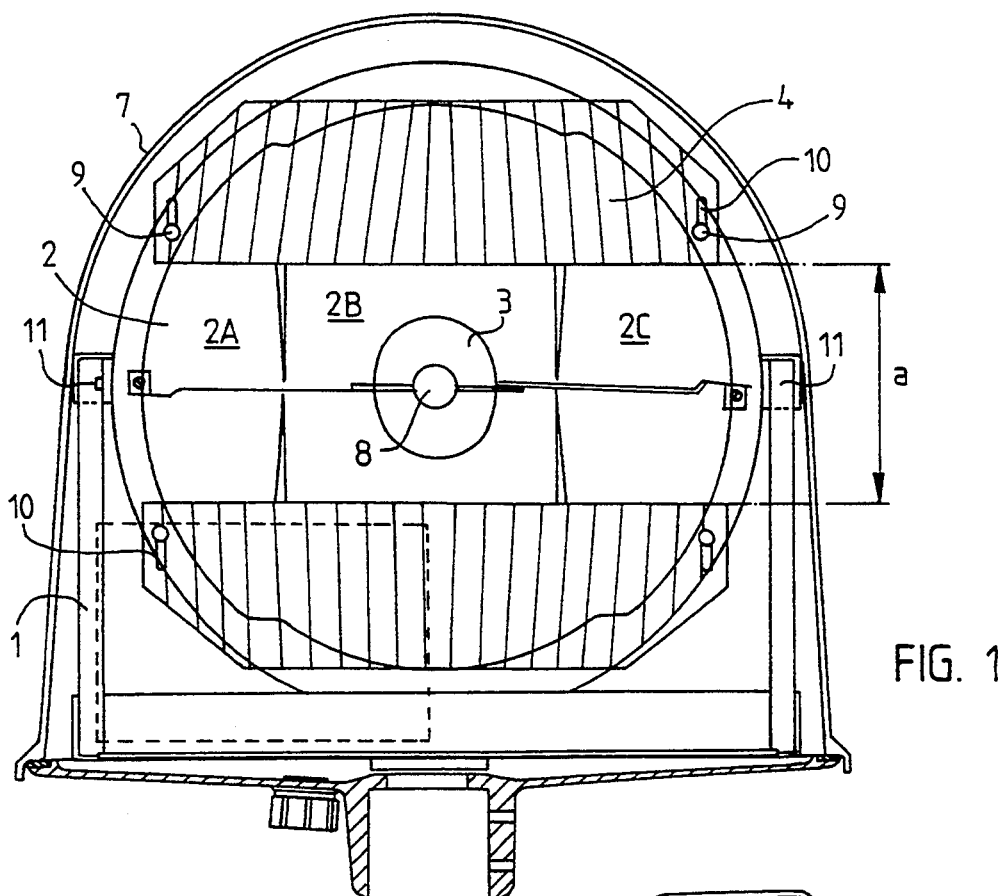
FIG. 1 is a front view of an illuminator according to the invention, that is, as viewed in the direction of the light beam.
Figure 2:
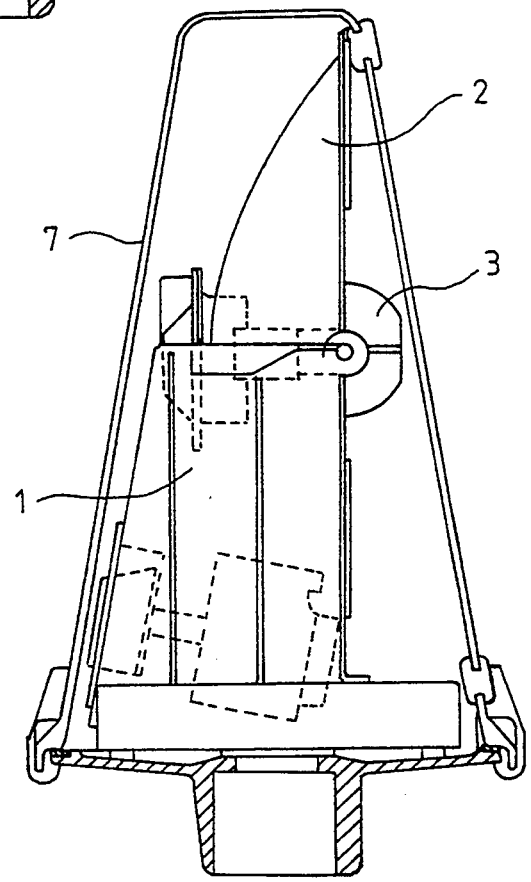
FIG. 2 is a cross-sectional view of the illuminator of FIG. 1 substantially at right angles to the light beam.

The illuminator according to the invention shown in FIG. 1 comprises an outermost water-proof casing 7 the front surface of which is transparent and which encloses the reflector means of the illuminator, and, if required, also the electronic means controlling the illuminator. This is possible as the illuminator casing can be positioned steadily on the underlying surface and need not be tilted for directing the light beam. The illuminator itself comprises an illuminator body 1 having a base portion and column-like portions projecting upwardly from the base portion, a reflector and an associated light source being supported on the column-like portions. The reflector comprises a generally cup-like rear reflector 2 which is fitted behind the light source and an ellipsoidal counter reflector 3 fitted in front of the light source. The main axis of the counter reflector is vertical, that is, parallel to the shorter side of the light beam, and the counter reflector further comprises a central opening 8 for allowing the passage of light emitted from the light source straight in the right direction. The rear reflector 2 is formed of a blank having the shape of a paraboloid generated by rotation and divided into three vertical sections 2A, 2B and 2C. The division is carried out in such a way that light beams originating from the light source and reflected from the two outermost sections 2A and 2C are directed sidewardly, thus forming a smallish acute angle with respect to light beams reflected from the middle section 2B. This smallish acute angle may be e.g. about 6°. Furthermore, two prismatic refraction plates 4 of transparent material are supported to the rear reflector 2, substantially in the plane of its mouth, in such a way that they cover the mouth of the rear reflector 2 with the exception of a substantially centrally positioned area of uniform width. The width of this area is a and its longitudinal axis is parallel to the longer side of the rectangular light beam of the illuminator. The distance a should be adjustable. By way of example, FIG. 1 shows a simple arrangement in which the refraction plates 4 are supported to the rear reflector 2 by means of screws 9 in such a way that the screws penetrate the refraction plates through elliptical openings 10. In this way the distance between the refraction plates 4 can be adjusted sufficiently.

As already mentioned above, the entity formed by the rear reflector, the counter reflector and the refraction plates is supported on the columns of the illuminator body 1 by means of joints 11 provided in the columns, the joints being attached to the rear reflector substantially at the ends of its horizontal axis.

Figure 3:
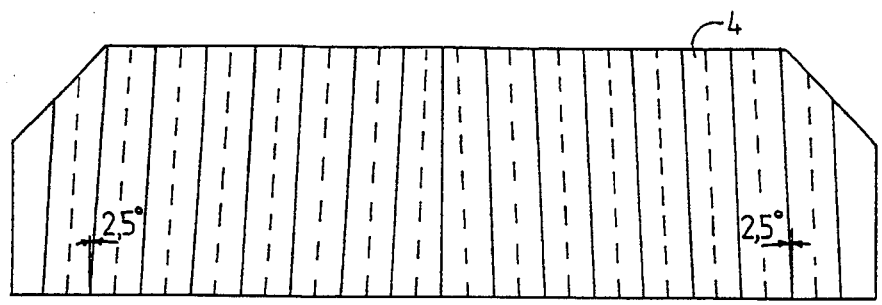
FIG. 3 is a front view of a refraction plate contained in the reflector of the illuminator.
Figure 4:
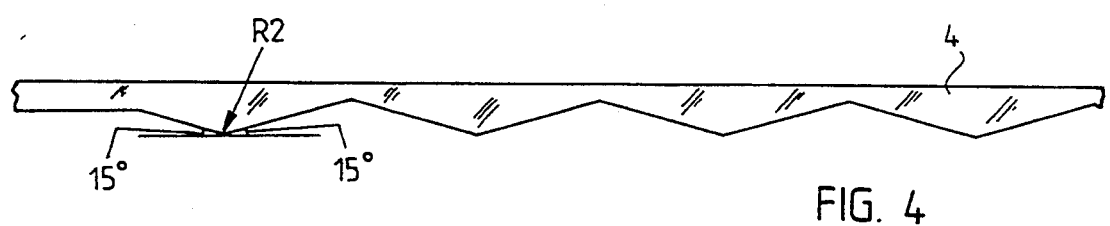
FIG. 4 is a side view of the refraction plate of FIG. 3.

FIGS. 3 and 4 show the refraction plate 4 in more detail. As appears from the figures, the prisms of the refraction plate have a directional angle which is about 2.5° in FIG. 3. This directional angle preferably ranges between about 2° and 5°. In FIG. 4, in turn, the angle of refraction of the refraction plates is about 15°. These given angle values are not critical but they can be adjusted to some extent in compliance with the specifications imposed on the light beam of the illuminator in each particular case.

Figure 5:
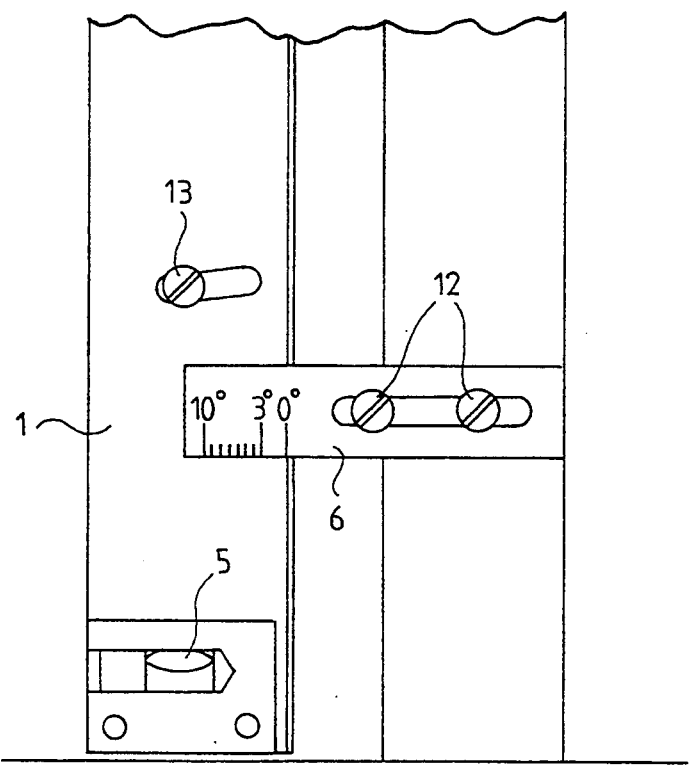
FIG. 5 shows an arrangement comprised in the illuminator according to the invention for adjusting the angle of tilt of the reflector.

FIG. 5 shows an arrangement comprised in the illuminator according to the invention, which enables the angle of tilt of the illuminator to be set in advance before the installation of the illuminator on a light support or other similar supporting surface. The arrangement shown in FIG. 5 comprises a levelling means attached to the illuminator body 1, such as a water level 5 which enables the illuminator body 1 to be positioned horizontally. In this position, the reflector structure, in turn, will be positioned vertically, that is, the light beam reflected from it will be horizontal. In this position, a scale plate 6 attached to the reflector is locked in a position 0° by means of screws 12, as shown in FIG. 5. Thereafter the light beam of the illuminator can be directed at a desired angle by tilting the reflector so that the scale plate 6 will indicate this desired angle value at the edge of the illuminator body 1. Thereafter the reflector can be locked in this tilted position by means of a screw 13 bearing against the illuminator body 1. In this way the reflector can be tilted reliably in advance at the desired angle of tilt. This arrangement avoids the use of separate, external directing devices difficult in use in the installation of the illuminator. After the installation, the direction can always be checked by means of the water level 5. This is because the water level 5 indicates if the installation surface of the illuminator is horizontal, whereby the angle of tilt of the reflector is the angle indicated by the scale 6. By means of the scale shown in FIG. 5, the reflector can be tilted 3° to 10° upward from the vertical plane, that is, the light beam can be lifted through a corresponding angle upward from the horizontal plane.

The illuminator according to the invention, especially a runway approach flashlight, is described above only by means of one exemplifying structural embodiment, and it is to be understood that the principles according to the invention can be realized by means of other similar structural arrangements without, however, deviating from the scope of protection defined in the attached claims.

I claim:

1. A runway approach illuminator for forming a directable light beam that is generally rectangular in transverse cross-section, so that such cross-section has two shorter sides and two longer sides, said illuminator comprising:

a body;

a light source supported on said body and oriented so as to have a front and a rear;

a forwardly facing cupped rear reflector having a mouth opening forwardly from behind said light source, and arranged to reflect light generally forwardly;

a rearwardly facing ellipsoidal counter-reflector, arranged to reflect light generally rearwardly from in front of said light source;

said rear reflector and counter-reflector being mounted to said body with said counter-reflector having a main axis thereof disposed substantially parallel to said short sides of said transverse cross-section of said beam.

2. The illuminator of claim 1, wherein:

said light source is a xenon lamp.

3. The illuminator of claim 1, further including:

said mouth of said rear reflector is disposed in a plane;

two prismatic refraction plates made of transparent material being supported on said rear reflector and being disposed substantially in said plane so as to cover said mouth but for a substantially centrally positioned area located between said plates and having a uniform width parallel to said short sides of said transverse cross-section of said beam.

4. The illuminator of claim 3, wherein:

said prismatic refraction plates have prismatic refracting surfaces angled at about 15° to said plane extending at directional angles of from about 2° to about 5° from parallelism with said short sides.

5. The illuminator of claim 3, further including:

adjustable supports supporting said plates on said rear reflector, for adjustment towards and away from one another or narrowing and broadening said area located between said plates.

6. The illuminator of claim 1, wherein:

said rear reflector comprises a central section flanked by two opposite outermost sections disposed adjacent one another in a direction parallel to said long sides; said central section being arranged to reflect said light beam along a first axis, and said outermost sections being arranged to reflect said light beam along respective second axis, which diverge forwardly from said first axis at respective acute angles, for spreading said light beam.

7. The illuminator of claim 6, wherein:

said angles are about 6°.

8. The illuminator of claim 1, further comprising:

a waterproof casing having a transparent front surface, said casing being arranged to be stationarily mounted;

said body being located within and stationarily supported on said casing; and said light source, rear reflector and counter-reflector being adjustably mounted to said body, so that said light beam can be aimed by tilting said light source, rear reflector and counter-reflector while said casing remains stationary.

* * * * *